Oct. 28, 1952     T. D. NATHAN     2,615,741
SEALING RING

Filed July 11, 1949     2 SHEETS—SHEET 1

INVENTOR.
TRACY D. NATHAN
BY Willard D. Eakin
ATTORNEY

Oct. 28, 1952     T. D. NATHAN     2,615,741
SEALING RING

Filed July 11, 1949                                                 2 SHEETS—SHEET 2

INVENTOR.
TRACY D. NATHAN
BY Willard D. Eakin
ATTORNEY

Patented Oct. 28, 1952

2,615,741

UNITED STATES PATENT OFFICE 2,615,741

SEALING RING

Tracy D. Nathan, Cuyahoga Falls, Ohio, assignor to Hamilton Kent Manufacturing Company, a corporation of Ohio Application July 11, 1949, Serial No. 103,989

1 Claim. (Cl. 288—19)

This invention relates to sealing ring assemblies or fluid-retaining joints, and especially to rings adapted for sealing the joints of underground water pipe, sewer pipe and the like, wherein bell-and-spigot or "tongue-and-groove" or sleeve-coupled pipe comprises a pipe member surrounding an inner pipe member and therewith defining an annular space to be sealed, and a sealing ring in the annular space.

Its chief objects are to provide a sealing ring having a desirably high radial compressibility for accommodating itself, without loss of sealing effect, to annular spaces of different radial dimensions; to provide a ring having a determinate stepping-up of its resistance as it is radially compressed, so that as a compression gasket, without self-energizing, it will be adapted to seal against high pressures when used in a suitably thin annular space; to provide some or all of the foregoing advantages in conjunction with adaptability of the ring for use as a self-energizing gasket as to one direction of fluid pressure sealed against; to provide a stop cushion for the pipe members; and to provide simplicity and economy of manufacture and mounting of the rings.

In each of the embodiments shown the ring, of natural or synthetic rubber, comprises a set of sealing ribs each of which has comparatively low resistance to radial compression throughout the first part of a large range of compressibility of the ring, followed by a step-up of resistance as the ring is further compressed, by reason of the coming into effect of the resistance of a hammock-like wall, but with extensive further compression of the ring as a whole made possible by the fact that the hammock-like wall overlies a cavity or cell into which it can be depressed.

The ring of each of the embodiments shown preferably is formed by the usual practice of extruding a continuous strip of the stock in suitable cross-sectional form, cutting successive lengths from the strip, and making each length annular by splicing its ends to each other. It is not wholly limited to annular cavities as the provision for high compressibility of the body of the ring.

Figure 1:
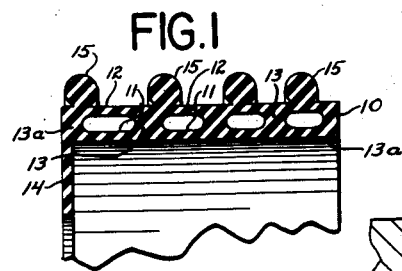
Fig. 1 is a fragmentary axial section of a ring embodying my invention in one of its preferred forms.
Figure 2:
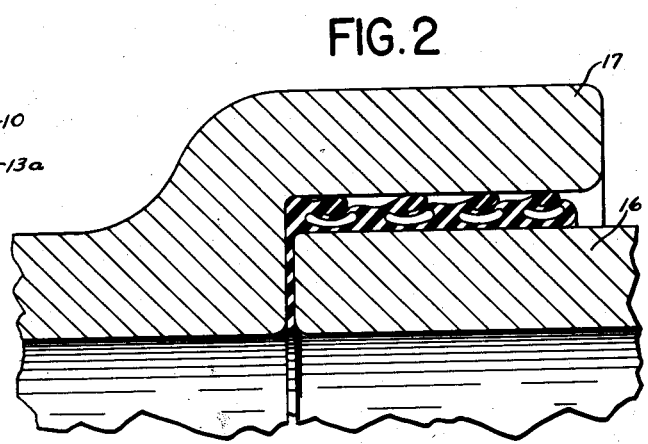
Fig. 2 is a similar section of a bell-and-spigot pipe joint showing the form and relationship that the ring has in use, the ring being adapted to seal as a compression gasket against a preponderance of pressure within the pipes and to be self-energizing for sealing against a preponderance of pressure external to the joint.

In the embodiment shown in Figs. 1 and 2 the ring comprises an annular body portion 10 formed with a set of circumferentially extending cavities or cells 11, 11 each of which is of considerable width axially of the ring and has for its radially outer wall a reach of stock 12 connecting annular webs such as the web 13 or 13ᵃ which in part define the cavities 11, each web 12 being depressible into its underlying cavity 11.

Preferably a radially wide and axially thin flange 14 is formed integrally with the body 10, to serve as a stop cushion for the pipe sections, and at positions a little off-set axially from the webs 13ᵃ, 13, in the direction away from the stop flange 14, the body 10 has integrally formed on its outer face a set of axially tiltable ribs 15, 15 each of which partially overlies one of the cavities 11.

In the assembling of the ring in the bell-and-spigot pipe joint of Fig. 2 the ring is first mounted as shown upon the spigot 16, and preferably but not necessarily is cemented to it. The spigot, with the ring on it, is then simply plugged into the bell member 17.

If the annular space to be occupied by the ring is of such radial dimension as to compress the ring only slightly, the ribs 15 are only moderately tilted by the plugging-in operation but still provide an adequate compression seal against a moderate preponderance of fluid pressure within the line of pipe, and a self-energizing seal against a preponderance of external fluid pressure.

If the annular space to be occupied by the ring is of such small radial dimension as to require the ring to be given a large amount of radial compression, each rib 15, in being further tilted by the plugging-in operation, contacts the adjacent web 12 and in its further yielding is required to depress the web 12 into the underlying cavity 11, resistance of the web 12 thus being added to the resistance of the rib 15 to being further tilted or depressed, but with considerable further compression of the ring made possible by the presence of the cavity 11.

Although the sealing faces of the bell and of the spigot are shown as being substantially cylindrical, the stretchability of the ring is such that the invention is not limited to this particular type of joint.

Figure 3:
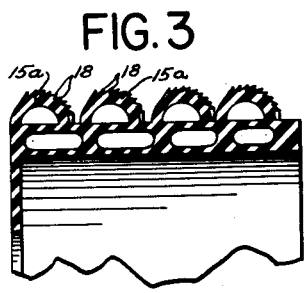
Fig. 3 is a similar section of a ring embodying the invention in another form.
Figure 4:
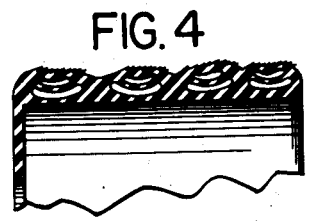
Fig. 4 is a similar section showing the shape assumed by the ring of Fig. 3 when it is incorporated in a pipe joint.

The ring shown in Figs. 3 and 4 differs from that shown in Figs. 1 and 2 in that instead of solid ribs it is formed with hollow ribs or arches 15a, 15a, preferably having on their outer faces saw-tooth ribs 18, 18 inclined in the direction such that they are further inclined by the plugging-in operation and are adapted to serve as self-energizing sealing lips against a preponderance of pressure external to the joint.

Figure 5:
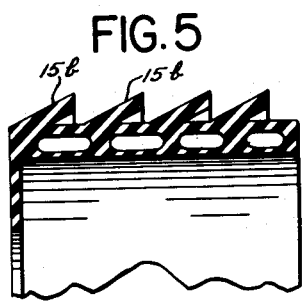
Fig. 5 is a similar section of another modification.
Figure 6:
Fig. 6 is a similar section showing the form taken by the ring of Fig. 5 when it is in use.

The ring illustrated in Figs. 5 and 6 corresponds to that shown in Figs. 1 and 2 except that the ribs, 15b, 15b, are of a different cross-sectional shape and have their bases directly over the adjacent cavity-defining webs, as shown.

Figure 7:
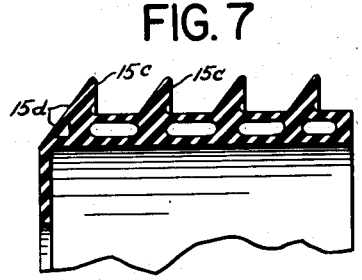
Fig. 7 is a similar section of another modification.
Figure 8:
Fig. 8 is a similar section showing the form taken by the ring of Fig. 7 when it is in use.

The ring of Figs. 7 and 8 illustrates still another type of ribs, 15c, 15c, the ribs being of sturdier form and positioned directly over, instead of being axially off-set from, the respective underlying cavity-defining webs, so that they afford high initial resistance to their tilting and, correspondingly, to radial compression of the ring. Also the ring of Figs. 7 and 8 is formed with a radially extensive taper surface 15d to facilitate its wedging into the bell.

Figure 9:
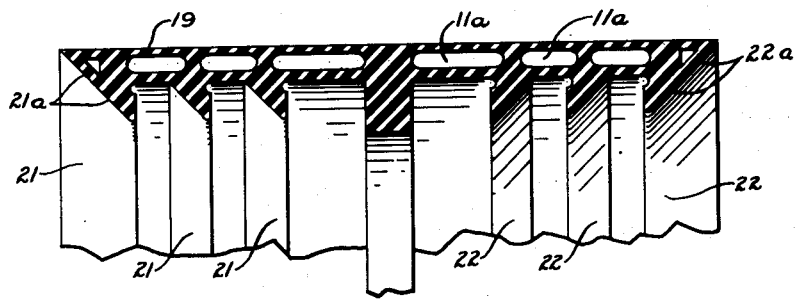
Fig. 9 is a fragmentary axial section of a ring embodying the invention and adapted for sealing a sleeve joint and to have self-energizing for sealing against a preponderance of pressure within the pipes.
Figure 10:
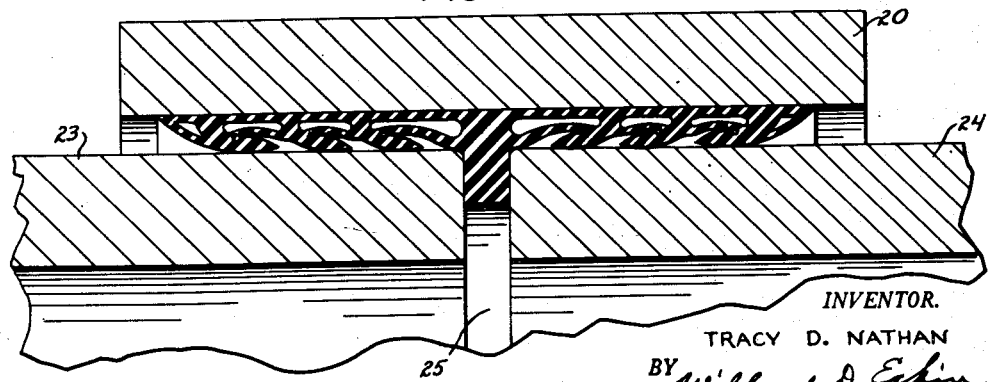
Fig. 10 is a fragmentary axial section of a sleeve joint sealed by the ring shown in Fig. 9.

The ring for sleeve joints shown in Figs. 9 and 10 comprises an annular body portion 19 formed with annular cavities 11a, 11a corresponding substantially to the cavities 11 of Fig. 1. In this embodiment the axially flat face of the ring is its radially outer face, adapted to seat against, and permissibly to be cemented to, the inner face of the coupling sleeve, 20, Fig. 10.

The inner face of the body 19 is formed with two sets of sealing ribs, 21, 21 and 22, 22, those of the two sets being inclined in opposite directions, such that by yielding to more inclined positions they facilitate the plugging-in of the respective male pipe members, 23 and 24, and such that they serve as self-energizing lip seals against a preponderance of fluid pressure inside of the pipe line. At its ends the ring is formed with radially extensive taper faces 21a, 22a to facilitate the wedging of the pipe ends 23, 24 into the ring. Preferably also the ring is integrally formed at its middle with an internal annular flange 25 to serve as a cushion stop for the pipe ends as they are plugged into the ring.

The mode of operation of all of the rings of Figs. 1 to 8, and of each half of the ring of Figs. 9 and 10, is substantially the same as that above described with respect to the ring of Figs. 1 and 2, except that the ring of Figs. 9 and 10 is self-energizing for sealing against preponderating internal pressure instead of external pressure, this being incident to the fact that in each embodiment the sealing ribs are inclined or easily inclinable in the direction in which they are urged by the plugging-in operation.

Further modifications are possible without sacrifice of all of the advantages set out in the above statement of objects and without departure from the scope of the appended claim.

I claim:

A resiliently deformable sealing ring for a fluid-retaining joint, said ring comprising an annular body portion formed with an annular cavity enhancing its radial compressibility and defined, at one periphery of said body portion, by an annular, flexible wall, the ring having, integral with said body portion, an annular sealing rib of which the base is positioned substantially at and merges with a solid annular part of the body portion which constitutes a side wall of the cavity, the said rib being of such radial height and of such lateral thinness and flexibility, and of such dimensions in relation to those of the other parts of the ring, that, upon being laterally bent in axially mating with a pipe member, the rib, substantially without change of position of its base, will exert as a sealing pressure only the recoil of its own flexure if only moderately distorted by the mating movement, but, if more pronouncedly distorted by the mating movement, will by its further flexing depress the said flexible wall, by force applied to said wall at a substantial distance from the base of the rib, and thus will have added to the force of its own recoil, to augment the sealing pressure, the recoil of the said flexible wall.

TRACY D. NATHAN.

REFERENCES CITED

The following references are of record in the file of this patent:

UNITED STATES PATENTS

| Number | Name | Date |
|---|---|---|
| 1,817,774 | Sipe | Aug. 4, 1931 |
| 1,926,197 | Durr | Sept. 12, 1933 |
| 1,967,466 | Damsel | July 24, 1934 |
| 2,184,376 | Beyer et al. | Dec. 26, 1939 |
| 2,280,183 | Bennett | Apr. 21, 1942 |
| 2,451,070 | Chamberlain | Oct. 12, 1948 |

FOREIGN PATENTS

| Number | Country | Date |
|---|---|---|
| 803,405 | France | of 1936 |